US012459114B2

(12) United States Patent
Markarian et al.

(10) Patent No.: US 12,459,114 B2
(45) Date of Patent: *Nov. 4, 2025

(54) MOBILE ROBOTIC ARM CONFIGURED TO PROVIDE ON-DEMAND ASSISTANCE

(71) Applicant: Markbotix, Inc., Northridge, CA (US)

(72) Inventors: Haroutioun Markarian, Porter Ranch, CA (US); Robert Jay Myles, Reseda, CA (US)

(73) Assignee: Markbotix, Inc., Northridge, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/961,922

(22) Filed: Oct. 7, 2022

(65) Prior Publication Data

US 2023/0111676 A1    Apr. 13, 2023

Related U.S. Application Data

(60) Provisional application No. 63/253,291, filed on Oct. 7, 2021.

(51) Int. Cl.
| | |
|---|---|
| *B25J 9/16* | (2006.01) |
| *B25J 5/00* | (2006.01) |
| *B25J 13/00* | (2006.01) |
| *B25J 13/08* | (2006.01) |
| *B25J 19/02* | (2006.01) |

(52) U.S. Cl.
CPC .............. *B25J 9/1612* (2013.01); *B25J 5/007* (2013.01); *B25J 9/162* (2013.01); *B25J 13/006* (2013.01); *B25J 13/089* (2013.01); *B25J 19/021* (2013.01)

(58) Field of Classification Search
CPC ........ B25J 13/089; B25J 5/007; B25J 9/1612; B25J 9/162; B25J 13/006; B25J 19/021; G05B 2219/40411
See application file for complete search history.

(56) References Cited

U.S. PATENT DOCUMENTS

| 9,972,322 B2 * | 5/2018 | Biswal ..................... G10L 17/20 |
| 10,910,249 B2 * | 2/2021 | Hsieh ................ H01L 21/67276 |
| 2024/0139957 A1 * | 5/2024 | Markarian ............. B25J 9/0027 |

OTHER PUBLICATIONS

Calderon et al, Humanoid social robots: A design for interaction, 2014, IEEE, p. 871-876 (Year: 2014).*
Lemburg et al., AILA—design of an autonomous mobile dual-arm robot, 2011, IEEE, p. 5147-5153 (Year: 2011).*

(Continued)

*Primary Examiner* — McDieunel Marc
(74) *Attorney, Agent, or Firm* — K&L Gates LLP

(57) ABSTRACT

A robotic system includes a platform, at least two wheels connected to the platform and driven by respective motors, a robotic arm having a base that is connected to the platform, an end-effector connected to the robotic arm at an end opposite the base, and a processor communicatively coupled to the respective motors, the robotic arm, and the end-effector. The processor is configured to receive a command or determine that an item has fallen on a floor, locate the item on the floor, determine a distance and a heading to the item, cause the respective motors to move the platform to the item within range of the robotic arm, cause the robotic arm to grasp the item with the end-effector, and cause the robotic arm to provide the item to a user.

20 Claims, 6 Drawing Sheets

(56) References Cited

OTHER PUBLICATIONS

Megalingam et al., Robotic arm control through mimicking of miniature robotic arm, 2017, IEEE, p. 1-7 (Year: 2017).*
Koch et al., Development of a Robotic Arm for Mini-Class ROV Dexterous Manipulation, 2019, IEEE, p. 1-5 (Year: 2019).*
Wu et al., Walking assist design of a dual-arm robot, 2014, IEEE, p. 273-278 (Year: 2014).*
Song et al., Mobile manipulation and visual servoing design of a configurable mobile manipulator, 2013, IEEE, p. 239-244 (Year: 2013).*

* cited by examiner

MOBILE ROBOTIC ARM CONFIGURED TO PROVIDE ON-DEMAND ASSISTANCE

PRIORITY CLAIM

This application claims priority to and the benefit as a non-provisional application of U.S. Provisional Patent Application No. 63/253,291, filed Oct. 7, 2021, the entire contents of which are hereby incorporated by reference and relied upon.

BACKGROUND

Gravity can be a hindrance for people that are confined to wheelchairs, those with low motor skills, and others who are mobility challenged. There are many medical devices that provide bodily support or help people who have limited mobility. The most common of these medical devices include wheelchairs, walkers/crutches, and braces. However, people with mobility challenges typically have significant issues with retrieving everyday items (e.g., reading glasses, remote controls, bottles, utensils, cups, magazines, smartphones, clothes, etc.) from the floor. Further, people with low motor skills tend to regularly drop or lose their grip on their items. Without assistance from others, these people will risk injury retrieving items from the floor or wait until someone else can retrieve it for them. In either scenario, mobility challenged individuals lose confidence in themselves.

There are known devices that are marketed as providing assistance to those with mobility challenges. One known device comprises a pole with an extended grip for retrieving items from the floor. Oftentimes the trigger for the grip is difficult to pull, especially for those with low grip strength or arthritis. Further, it can be difficult to orientate the pole in the correct manner to effectively retrieve the item, even for those with full motor skills. Moreover, it is fairly burdensome for someone to carry around a long pole.

Another known device includes a robotic arm that connects to a user's wheelchair. While the robotic arm can reach down and pick up close items, the robotic arm's reach is limited to a short distance with respect to the wheelchair and its mobility is limited by the user. This means that a user has to move their wheel chair to a fallen item to be within reach of the robotic arm. Further, the weight of the robotic arm actually makes it harder for a user to maneuver the wheelchair. Lastly, this known device shares the wheelchair's power supply, thereby reducing battery life of the wheelchair.

SUMMARY

Example systems, methods, and apparatus are disclosed herein for a robotic system that is configured to retrieve items from a floor to assist individuals with low or no mobility. The robotic system includes a robotic arm mounted on a separate, free-moving chassis. The robotic arm includes an end-effector that includes a griping mechanism. A camera may be connected to the robotic arm and/or the end-effector to provide a field of view when the robot is not in a line of sight of a user.

The robotic arm may be manually controlled via voice commands, user gestures, or via an application (e.g., an app) on a smartphone or tablet computer. The robotic arm may also be placed in a semi-autonomous mode or a full-autonomous mode. In a semi-autonomous mode, the robotic system is commanded to a desired location by a user. Upon receiving an instruction from the user, the robotic arm is configured to search for an item within reach or a specified threshold distance. After locating the item, the robotic arm grips and lifts the item automatically towards the user. In some instances, the robotic arm uses the smartphone, tablet computer, or a visual indicator (e.g., a tag, label, infrared LED, etc.), as a beacon to determine where the arm is to be extended or lifted. In a full-autonomous mode, the robotic system is configured to either detect that an item has been dropped and retrieve the item and/or receive a command that an item has dropped, locate the item, and retrieve the item for the user. The robotic system may use one or more algorithms to perform object recognition and one or more algorithms for commanding one or more joint motors to perform a smooth motion of item retrieval for a user.

The example robotic system accordingly provides more independence for people with disabilities or limited mobility. The independence provided by the robotic system eliminates a risk of a user falling to retrieve an item or hurting themselves bending over. As such, the robotic system disclosed herein provides assistance for people that have a wide variety of disabilities and is not limited to just wheelchair users.

In light of the present disclosure and the above aspects, it is therefore an advantage of the present disclosure to provide a mobile robotic system that provides automatic retrieval of items from a floor or other ground-level surface that is difficult for a user to reach.

It is further advantage of the present disclosure to use machine vision or laser depth estimates to locate an item on a floor to provide automatic retrieval without having to receive precise commands from a user.

It is yet another advantage of the present disclosure to use a location of a smartphone to determine where an item is to be returned.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Methods, systems, and apparatus are disclosed for a robotic system that is configured to retrieve items from a floor to assist individuals with low or no mobility. Reference is made herein to the robotic system being configured to retrieve items dropped by an individual. However, it should be appreciated that the robotic system is configured to retrieve virtually any item that is within reach of its robotic arm. For instance, a user may command the robotic system to retrieve items from a table across a room or retrieve floor level items such as a pet food dish.

The robotic system is configured to lift any item that can be grasped and weighs less than a designated threshold. In some embodiments, the weight threshold may be 5 pounds, 10 pounds, 20 pounds, etc. Further, the grip may be able to grasp items that have a maximum diameter or thickness of 4 inches, 6 inches, 8 inches, etc.

Figure 1:
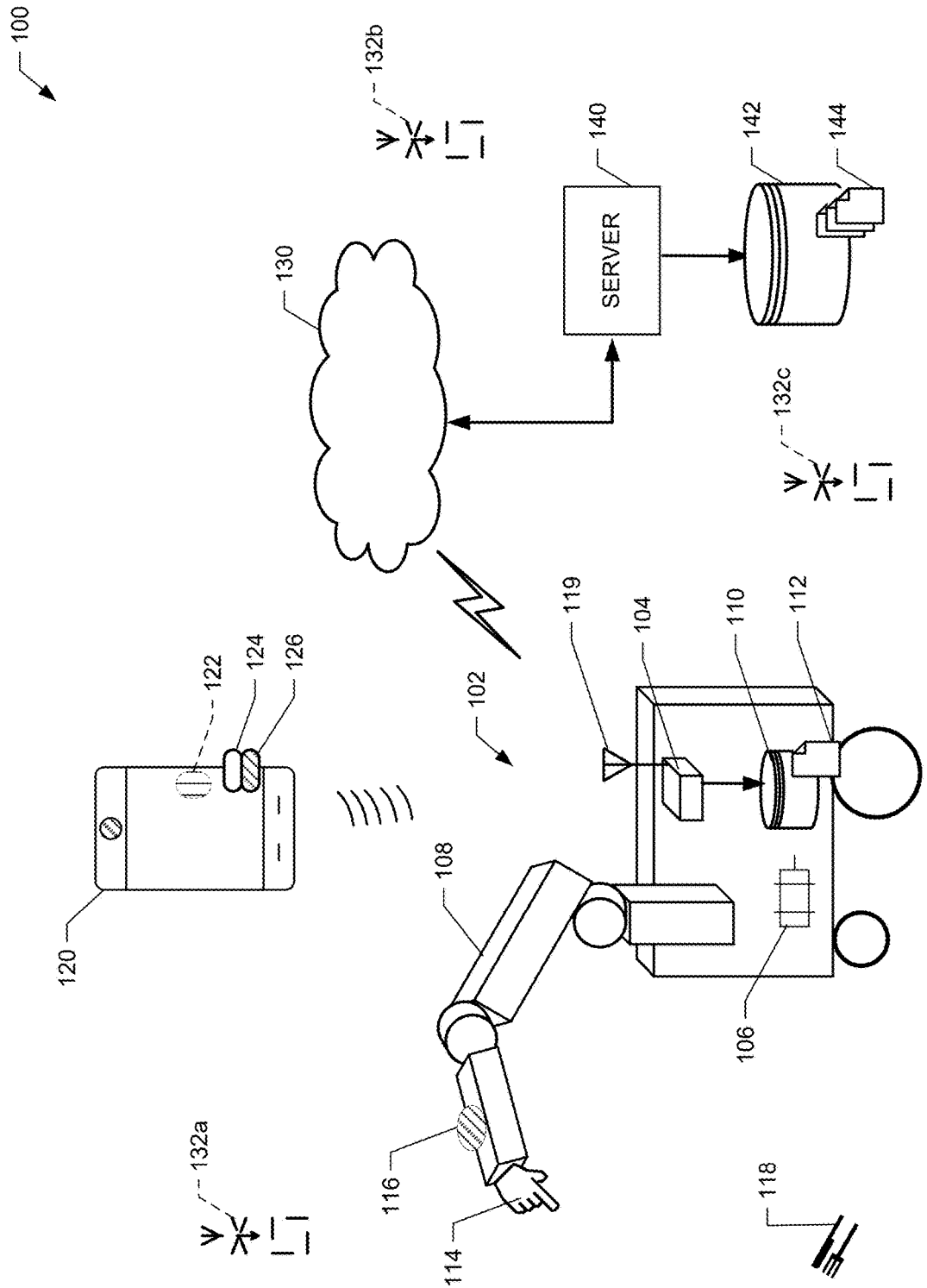
FIG. 1 is a diagram of a retrieval system including a robotic system and a user device, according to an example embodiment of the present disclosure.

FIG. 1 is a diagram of a retrieval system 100, according to an example embodiment of the present disclosure. The system 100 includes a robotic system 102 having a processor 104 that is communicatively coupled to at least one drive motor 106, a robotic arm 108, and a memory device 110. The processor 104 may include any control logic, controller, microcontroller, microprocessor, ASIC, or other computational circuit. The processor 104 is communicatively coupled to the memory device 110, which may include any RAM, ROM, flash memory, etc. The memory device 110 stores computer-readable instructions 112, which when executed by the processor 104, cause the processor 104 to perform the operations disclosed herein. The instructions 112 may also include one or more algorithms for detecting items, one or more drive control algorithms, one or more robotic arm control algorithms, and/or one or more algorithms to detect that an item has fallen on a floor.

In the illustrated example, the processor 104 is configured to send one or more signals to the drive motor 106, which causes wheels to turn. In some instances, each rear wheel may be coupled to a separate motor 106 to provide a zero-turn radius for indoor spaces. The processor 104 may provide commands to cause the wheels to rotate a desired distance using the motor 106.

The processor 104 is also configured to control the robotic arm 108, which may include one or more joints connecting together two or more links. Each joint may provide rotational movement (between 90 and 360 degrees) between two links. The rotation of each joint is controlled by a motor or a servo. The robotic arm 108 also includes an end-effector 114 that comprises a grip. The processor 104 is configured to cause the grip to open or close. In some embodiments, the grip may include one or more pressure sensors that transmit data indicative of force applied on an object. The processor 104 may use data from the pressure sensors to ensure an item is securely held by the grip. The force data may ensure that the processor 104 does not cause the grip to close too tightly around an item, potentially damaging the item.

The robotic arm 108 may also include one or more sensors 116. The sensors 116 may include a camera to provide a field of view relative to the end-effector 114. The sensors 116 may also include a laser range finder, a force sense, an inertial sensor, a voice sensor, and/or a retina sensor. Data from the sensors 116 is used by the processor 104 for locating an item 118, gripping the item, and handing the item to a user.

As shown in FIG. 1, the processor 104 includes or is communicatively coupled to a transceiver/antenna 119. The transceiver/antenna 119 is configured for a Bluetooth® protocol, a Wi-Fi protocol, a cellular protocol, or an NFC protocol to communicate with a user device 120 (e.g., a smartphone, a tablet computer, a laptop computer, a desktop computer, a workstation, etc.). In this embodiment, the user device 120 is configured as a remote control for the robotic system 102.

The user device 120 communicates with the robotic system 102 via a mobile application 122, which may connect to the robotic system via one or more command application programming interfaces ("APIs"). The mobile application 122 may be defined by one or more instructions stored in a memory device of the user device 120, where execution of the instructions by a processor 124 of the user device 120 causes the user device 120 to perform the operations discussed herein. The application 122 may include one or more user interfaces for commanding or otherwise controlling the robotic system 102.

Figure 2:
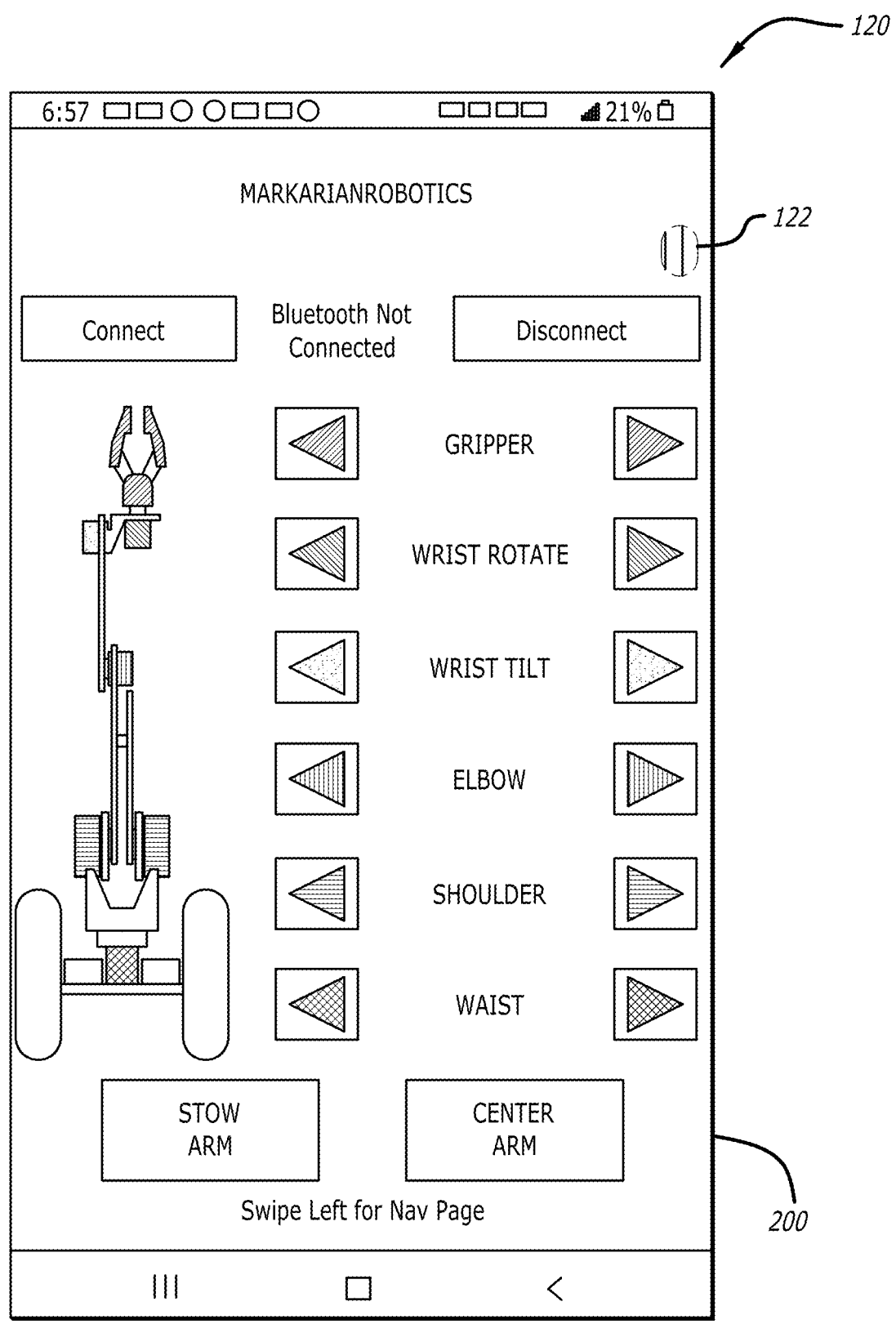
FIG. 2 is a diagram of a user interface of a mobile application operating on the user device of FIG. 1 for controlling the robotic system, according to an example embodiment of the present disclosure.

FIG. 2 is a diagram of a user interface 200 of the mobile application 122 operating on the user device 120 of FIG. 1, according to an example embodiment of the present disclosure. The user interface 200 includes options for connecting and/or activating the robotic system 102 via, for example, a Bluetooth® connection. In other examples, a Wi-Fi connection, a cellular connection, or a long distance packet radio connection may be used. The user interface 120 includes command options for manually controlling the robotic system 102, including causing the wheels to move. The user interface 120 also includes command options for opening/closing the end-effector 114, rotating the end-effector 114, and tilting the end-effector 114. Further, the user interface includes command options for rotating an elbow joint, a shoulder joint, and a waist joint of the robotic arm 108.

Selection of one of the command options causes the application 122 to transmit a message or s signal to the transceiver 119 of the robotic system 102. The transceiver 119 transmits the received message/signal to the processor 104, which is configured to decode the message/signal into one or more movement commands. In some embodiments, the instructions 112 specify how the received messages/signals are to be converted into commands for the drive motor 106 and/or joint motors of the robotic arm 108. The processor 104 may be configured to use a feedback signal from the drive motor 106 and/or the joint motors to determine the robotic system 102 moved as instructed or determine that additional movement is needed to achieve the instructed movement.

In other examples, the user interface 200 may include navigation commands with respect to the end-effector 114. In these other examples, the processor 104 uses the instructions 112 to determine how certain joints are moved to cause the robotic arm 108 to move in the specified manner. For example, the user interface 200 may include commands for raising, lowering, extending, retracting, and moving the end effector 114 left and right. Based on these commands, the processor 104 of the robotic system 102 uses the instructions 112 to determine which joints need to be moved to cause the end-effector 114 to move in the desired manner. This may including determining when a joint has reached a limit of travel and activating other joints or causing the drive motor 106 to move the robotic system 102 closer or further from the item 118.

The user interface 200 of FIG. 2 also includes commands for stowing and centering the robotic arm 108. The user interface 200 may also display video from the sensor 116 that shows a perspective from the end-effector 114. In this instance, the navigation of the robotic arm 108 is registered by the processor 104 to the current view of the sensor 116 using known position and orientation transformations. Accordingly, received commands are interpreted by the processor 104 with respect to the field of view to cause the robotic arm 108 to move in the corresponding manner. The user interface 200 may include an option for a user to toggle between field-of-view movement versus absolute movement.

In an example of field-of-view movement, the end-effector 114 of the robotic arm 108 is aligned with a path of travel of the wheels. As such, commands received via the user interface 200 in the processor 104 are processed without conversion. However, in another example, the robotic arm 108 has been moved such that the end-effector 114 and a field-of-view of the sensor 116 is rotated to face toward the ground. In this example, a user may press a forward command, intending to have the robotic system 102 move closer to a dropped item. However, the processor 104 is configured to determine that the sensor 116 is aligned downward. The processor 104 may use joint positions of the robotic arm 108 to determine an orientation of the sensor 116. The processor 104 uses a known transformation between the orientation of the sensor 116 and a normal (path of travel) orientation to convert the command from the user interface 200 into one or more instructions that cause the joints of the robotic arm 108 to rotate such that the end-effector 114 approaches the item. Thus, while the user commands the robotic system 102 to move forward, the processor 104 interprets the command as a desire to reach for a dropped item and instead moves the robotic arm 108. In the above-example, the processor 104 is configured to track joint positions of the robotic arm 108 (using feedback from the joint motors or joint sensors) and determine position/orientation transformations from a normal, zero-point orientation. Thus, when commands are received, the processor 104 is configured to convert the commands into movement instructions for the wheels and/or joint motors using the determined position/orientation transformations.

The user interface 200 of FIG. 2 may be used for a manual mode. The mobile application 122 may also provide for a semi-autonomous mode and/or a full-autonomous mode. In the semi-autonomous mode, the user interface 200 prompts a user for commands to move the robotic system 102 to a desired location. The user interface 200 may include a button or icon, when pressed, causes the robotic system 102 to search for an item within its vicinity, grip the item, and raise the item towards the user (or bring the item to the user). The robotic system 102 uses data from the sensor 116 for identifying the item, such as machine vision to distinguish items that project above a flat surface of a floor. The robotic system 102 may then use a laser range finder to determine a distance or heading to the item. The processor 104 of the robotic system 102 uses the distance and heading information to determine how the joints of the robotic arm 108 are to be rotated to reach the item. After the item is detected within grasp of the gripper, the processor 104 causes the gripper to close and the robotic arm 108 to raise. At this point, a user may take the item from the robotic arm 108 or command the robotic system 102 to move to the user.

In an example, the user interface 200 may include a command option to retrieve a fallen item. Selection of the command option causes the application 122 to transmit a retrieval signal to the processor 104 via the transceiver 119. After receiving the retrieval signal, the processor 104 uses the instructions 112 to determine that an item from a floor or other surface is to be retrieved. The processor 104 is configured to actuate the sensor 116 to locate the desired item.

When the sensor 116 includes a camera, the processor 104 receives video data. The processor 104 may analyze the video data using one or more object recognition algorithms. In some embodiments, after detecting an item, the processor 104 transmits the corresponding image for display on the user device with a prompt for a user to confirm the item to retrieve. When the user provides a positive confirmation via the application 122, the processor 104 is configured to cause the robotic system 102 to retrieve the imaged item. However, when the user provides a negative confirmation via the application, 122, the processor 104 is configured to cause the robotic arm 108 to further scan the area searching for other items. The process may be repeated until the item is located in the video recorded by the sensor 116. In some instances, the processor 104 may also cause the wheels to move to expand the search area for the item.

In some embodiments, the user interface 200 includes an option for a user to enter a type of item dropped, such as 'fork', 'knife', 'ball', 'magazine', etc. In these embodiments, the processor 104 searches for template shapes that correspond to the specified item. The processor 104 then uses the selected template for locating the item in the video data from the sensor 116.

In other embodiments, the video data from the camera is transmitted by the processor 104 to the application 122. The user may use the user interface 200 to move the robotic system 102 to the dropped item. Alternatively, the user may provide an input, via a touchscreen of the user device 120. The input may include a selection of the item in the video data. Selection of the item is transmitted to the processor 104 for directing the robotic system 102 to the selected item.

When an item is identified in the video data, the processor 104 is configured to transmit a command to the robotic arm 108 to retrieve the item. Since a distance between the sensor 116 and the end-effector 114 is known, an orientation and a distance to the item can be determined based on a current position and orientation of the robotic arm 108. In other words, the processor 104 is configured to use a known position and orientation of the robotic arm 108 to determine which direction the sensor 116 is facing. Based on a location of the item in the image, the processor 104 can determine a distance and orientation of the item with respect to the end-effector 114. The processor 104 is configured to use the determined distance and orientation to cause the joint motors and/or the drive motor 106 to move to gradually reduce the distance to the item and align the end-effector 114 with the item such that they have the same orientation. After reaching the item, the processor 104 commands the end-effector 114 to close, thereby securing the item.

In some examples, the robotic system 102 is configured to automatically bring the item to a user. In some examples, the transceiver 119 and the processor 104 may use local radio signals to determine an approximate position and/or orientation to the user device 120. In these examples, the retrieval system 100 may include additional beacons 132*a*, 132*b*, and 132*c* to enable the processor 104 to triangulate the position of the robotic system 102 relative to the user device 120. In these other examples, the application 122 and the processor 104 may both determine positions relative to the beacons 132. The processor 104 may transmit the position of the user device 120 to the processor 104, which determines a path to bring the item to the user. In addition to causes the wheels of the robotic system 102 to move, this may also include causing the robotic arm 108 to raise the item for the user. In some embodiments, the application 122 may transmit altitude information to the processor 104, which is used for raising the robotic arm 108. Alternatively, the processor 104 may cause the robotic arm 108 to raise to a default height corresponding to a reaching height of a seated user.

In some embodiments, the sensor 116 may include an infrared light projector and an infrared light sensor. In these embodiments, the infrared light projector may transmit a grid-pattern of light. When the end-effector 114 is pointed at the floor, the light is projected onto the floor. The infrared light sensor receives the reflected light, and transmits corresponding data to the processor 104. The processor 104 is configured to detect deviations in the grid pattern, which correspond to outlines of items on the floor. The processor 104 may be configured to use the detected grid pattern to identify the fallen item. Further, the processor 104 uses the detected grid pattern to determine an orientation and/or distance to the item.

In some embodiments, the processor 104 may use Wi-Fi signals, Bluetooth® signals, or other terrestrial signals from the user device 120 and/or the other local devices 132 to determine a distance and/or a heading to a user. After detecting that a user (e.g., the user device 120) is outside of reach range, the processor 104 causes the robotic system 102 to move toward the user device 120. The processor 104 may use images from the camera or data from the range finder to navigate around objects in an indoor or outdoor environment.

For the full-autonomous mode, the mobile application 122 includes a user interface that provides an activation for the robotic system 102. After being activated, the processor 104 uses image data and/or range data from the sensor 116 to detect a falling item or detect an item that is on a floor around a user. In some embodiments, the sensor 116 includes a microphone. An item that falls produces a loud sound, which is detected by the processor 104 for locating the item. In some embodiments, the microphone is directional to enable the processor 104 to determine a direction and/or heading based on the detected sound. In response, the processor 104 causes the robotic system 102 to move to the item and use the robotic arm 108 to pick up the item for the user. In other instances, the robotic system 102 receives a command from a user that an item has fallen and accordingly searches for and retrieves the item, as described above.

In the full-autonomous mode and/or the semi-autonomous mode, the robotic system 102 may have a home station that provides power charging for an on-board battery. In some instances, the home station may also provide for wireless communication with the processor 104 and/or include one of the terrestrial beacons 132. Between uses, the robotic system 102 may return to the home station to charge and stay out of the user's way. Upon a call from a user, the robotic system 102 is configured to return to a user based on a specific location or using location tracking of the user device 120.

In some embodiments, the mobile application 122 may include features for voice, user gestures, and/or retina commands. Commands spoken into the user device 120 and/or eye movement/user gestures recorded by a camera of the user device 120 are transmitted to the processor 104. In turn, the processor 104 converts the voice commands and/or eye movement into corresponding commands for the robotic arm 108 or drive motor 106.

Figure 3:
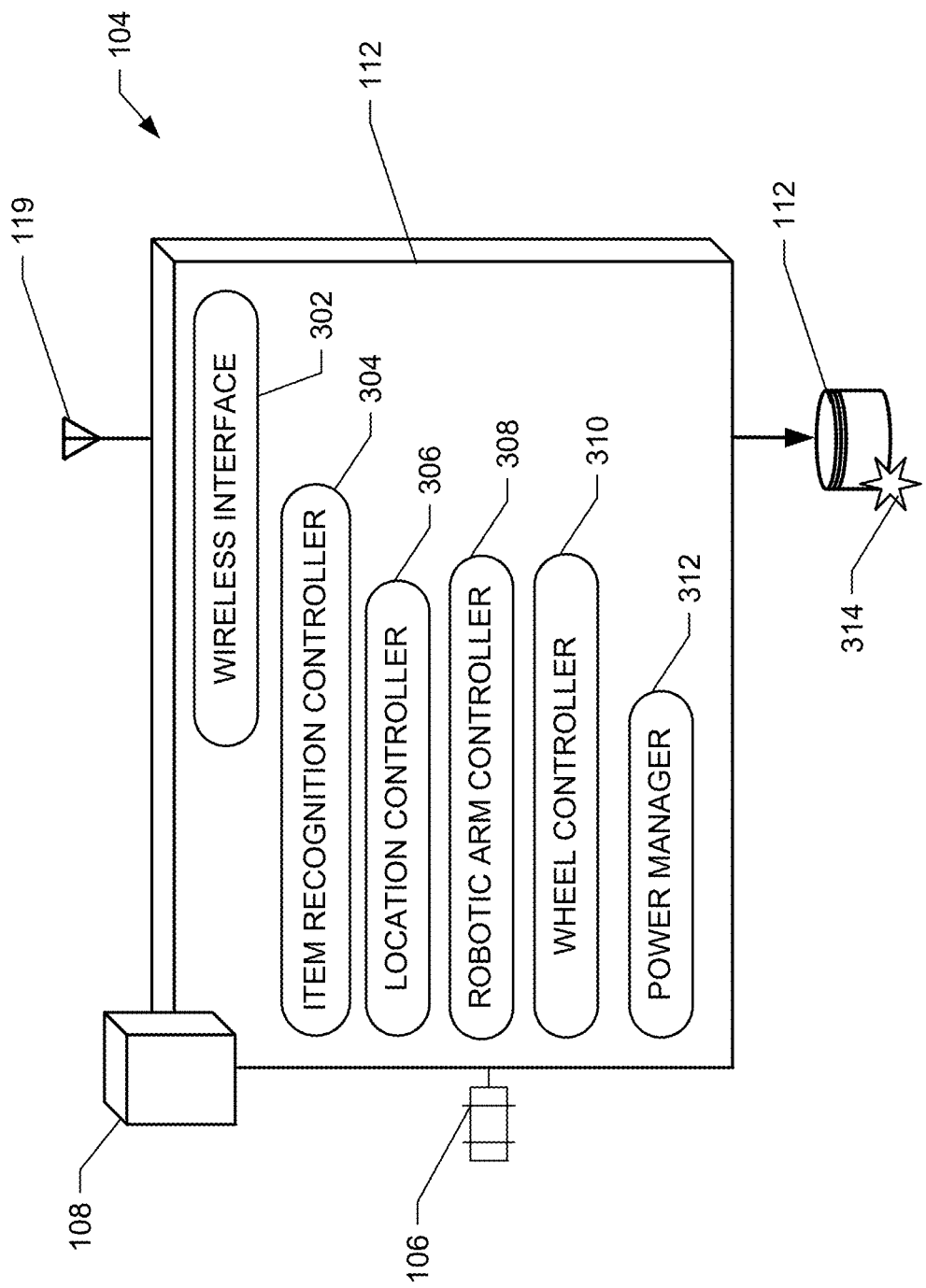
FIG. 3 is a diagram of a processor of the robotic system of FIG. 1, according to an example embodiment of the present disclosure.

FIG. 3 is a diagram of the processor 104 of the robotic system 102 of FIG. 1, according to an example embodiment of the present disclosure. The processor 104 may be configured with one or more modules that enable the processor to perform the operations described herein. The modules may be software modules that are defined by the instructions 112 stored in the memory device 112. As shown, the modules may include a wireless interface 302, an item recognition controller 304, a location controller 306, a robotic arm controller 108, a wheel controller 310, and a power manager 312.

The wireless interface 302 is communicatively coupled to the transceiver 119 and configured to provide remote communication via at least one of a Wi-Fi protocol, a cellular protocol, a Bluetooth® protocol, a Zig-Bee™ protocol, or an NFC protocol. The wireless interface 302 may also receive signals from the beacons 132, which are used to determine a relative location. The wireless interface 302 may also provide pairing with the user device 120 or a wireless local area network.

The item recognition controller 304 is configured to analyze images or data from the sensor 116 to locate an item. When the sensor 116 includes a microphone, the item recognition controller 304 is configured to analyze sound waves to detect an item drop. The item recognition controller 304 may be configured to access a library 314 of template items (or sound signatures), which is stored in the memory device 112. For item recognition using images, the library 314 may include images or templates of possible items, such as utensils, books, balls, remotes, etc. The item recognition controller 304 is configured to compare the templates or images to the recorded images to determine if there is a match using, for example, shape or pixel matching. Alternatively, the library 314 may include a machine learning algorithm that is trained for item recognition. Images from the sensor 116 are used as an input to the machine learning algorithm, which outputs a most likely item. For infrared data, the library 314 may include templates or a machine learning algorithm that corresponds to a surface profile of items. For acoustics, the library 314 may include sound signatures or a machine learning algorithm that corresponds to sounds of dropped items.

When an item is recognized and/or when an input is received, the controllers 308 and 310 are configured to determine a path and/or position/orientation for the robotic arm 108 to acquire the item. This may include using data from the sensor 116 to determine a heading, direction, and/or distance to an item. The controllers 308 and 310 may use a known pose of the robotic arm 108 to determine an orientation and/or position of the sensor 116 to determine how the item is to be acquired. The robotic arm controller 108 is configured to determine possible joint rotations to determine how the robotic arm 108 may be posed to acquire an item. The robotic arm controller 108 is programmed with reach limits and/or travel limits of the joint motors to determine reach limits when the robotic system 102 is stationery. The wheel controller 310 is configured to determine how fast, a direction of travel, and a distance of travel to an item when the robotic arm controller 108 determines that an object is not within reach. Together, the wheel controller 310 and the robotic arm controller 308 determine how the wheel driver motors 106 and/or the robotic arm joints are to be moved to acquire an item.

The location controller 306 is configured to manage a current location of the robotic system 102. When the beacons 132 are used, the location controller 306 uses, for example, triangulation to determine a relative position. Alternatively, the location controller 306 may triangulate using cellular signals. Further, the location controller 306 may use GPS coordinates from a satellite to determine a location. In yet other examples where the robotic system 102 includes a charging dock, the location controller 306 may use dead reckoning data based on feedback from the drive motors 106 and/or force data from one or more accelerometers/inertial sensors to detect movement and/or a location relative to the charging dock.

The location controller 306 may receive a location from the user device 120. The location information may include GPS coordinates, a location relative to the beacons 132, a location based on cellular signals, etc. The location controller 306 is configured to calculate a vector between the location of the robotic system 102 and the user device 120 to bring an item to a user. The location controller 306 determines, for example, a path, which is used for generating a series of instructions to active the drive motors 106 for rotating the wheels. The location controller 106 may also use known reach information of the robotic arm 108 to determine when an item is in proximity to the user device 120, and hence the user. The known dimensions of the robotic arm 108 and current pose information may be used in determining the vector and/or path.

In some embodiments, the sensor 116 may be used to detect obstacles. The item recognition controller 304 is configured to detect obstacles and/or determine a position of the obstacle with respect to the robotic system. Obstacles may include furniture, pets, floor clutter, medical devices, walls, appliances, etc. The wheel controller 310 is configured to use the obstacle information to create multiple vectors (or a path) to navigate around the obstacle.

In some embodiments, the location controller 306 may also determine a height and/or altitude of the robotic system. The location controller 306 may determine height using barometric pressure sensor and/or one or more terrestrial signals that are provided in conjunction with cellular signals. In these embodiments, the location controller 306 may also receive a height and/or altitude from the user device 120. The location controller 306 may then determine a height difference between the end-effector 114 and the user device 120 to determine how much the robotic arm 108 should be raised to return a dropped item.

The power manager 312 is configured to regulate battery usage and charging of the robotic system 102. In some embodiments, the power manager 312 monitors a battery life. When remaining power drops below a threshold, the power manager 312 may cause the wheel controller 310 to move the robotic system 102 to a charging dock. In some embodiments, the power manager 312 transmits information to the user device 120 for displaying a power level and an estimated time until charging is needed. In some embodiments, the power manager 312 is configured to regulate activation of the motors to ensure a current draw does not exceed a threshold.

Figure 4:
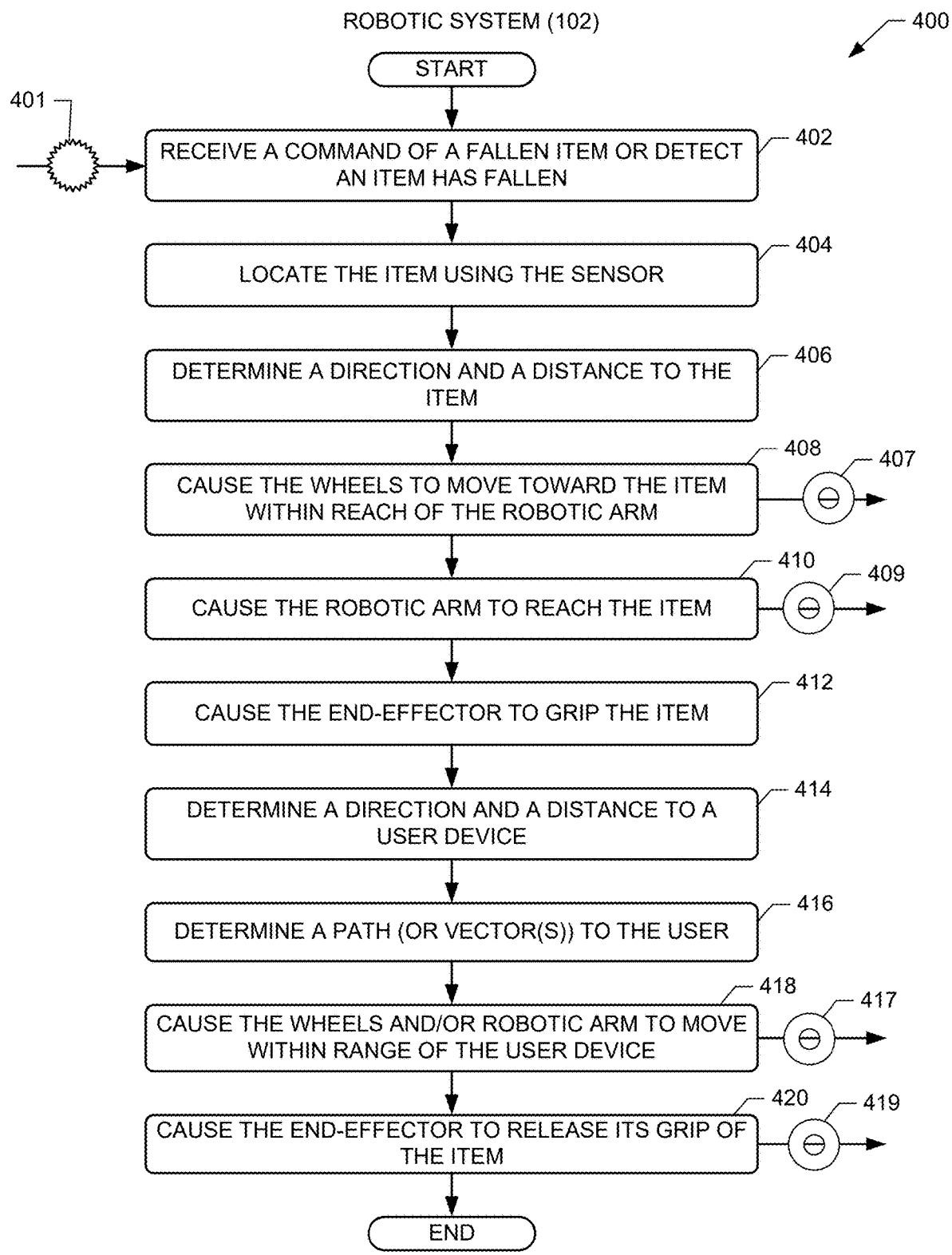
FIG. 4 shows a flow diagram illustrating an example procedure for obtaining an item using the robotic system of FIGS. 1 to 3, according to an example embodiment of the present disclosure.

FIG. 4 shows a flow diagram illustrating an example procedure 400 for obtaining an item using the robotic system 102 of FIGS. 1 to 3, according to an example embodiment of the present disclosure. The example procedure 400 may be carried out by, for example, the processor 104, the server and/or the application 122 described in conjunction with FIGS. 1 to 3. Although the procedure 400 is described with reference to the flow diagram illustrated in FIG. 4, it should be appreciated that many other methods of performing the functions associated with the procedure 400 may be used. For example, the order of many of the blocks may be changed, certain blocks may be combined with other blocks, and many of the blocks described are optional.

The procedure 400 begins when the robotic system 102 receives a command 401 that is indicative of a fall item or other item desired by a user (block 402). The command 401 may be received from the user interface 200 of the user device, described in connection with FIG. 2. The command 401 may simply indicate that an item has fall. Alternatively, the command 401 may identify the desired item, such as a utensil, glasses, a book, a pet toy, etc. In other embodiments, the command 401 is generated internally after the processor 104 of the robotic system 102 detects that an item has fallen using data from the sensor 116. In some embodiments, the processor 104 transmits a prompt indication of the identified item for the user to confirm before progressing through the procedure 400. When the identified item is not correct, the processor 104 may use data from the sensor 116 to locate another item.

The example procedure 400 next locates the item using the sensor 116 (block 404). The processor 104 may use image recognition when the sensor 116 is a camera. After locating the item, the processor 104 determines a direction and/or distance to the item (block 406). As described above, the processor 104 may use a known pose of the robotic arm 108 and known position of the sensor 116 on the robotic arm 108 to estimate a distance and/or a direction to the item. Alternatively, the robotic system 102 may locate the item based on commands from the user to position the robotic arm 108 within gripping range of the item. In these alternative embodiments, block 406 may be omitted because the user is providing the direction and movement commands to the item.

The example processor 104 next transmits one more instructions or signals 407 causing the wheels to move the robotic system 102 to within reaching distance of the item (block 408). When the robotic arm 108 is already within reaching distance, the processor 104 may omit this operation. The example processor 104 then transmits one more instructions or signals 409 causing the robotic arm 108 to reach for the item (block 410). If the item is out-of-reach, the processor 104 may return to block 408 to move the robotic system 102 closer to the item.

After reaching the item, the processor 104 causes the end-effector 114 to grip the item (block 412). In some embodiments, the processor 104 causes the end-effector 114 to close tighter until one or more pressure sensor measurements by pressure sensors within the end-effector 114 exceed a threshold. The processor 104 next determines a direction and/or distance to a user device 120 (block 414). In some embodiments, the processor 104 determines a current location of the robotic system 102 and a current location of the user device 120 using, for example, local beacons 132, cellular signals, GPS signals, etc. The processor 104 then uses the current locations of the user device 120 and the robotic system 102 to determine the direction/distance. The processor 104 may also determine (or receive information indicative of) heights and/or altitudes of the user device 120 and/or the robotic system 102. The processor 104 then creates a path or one or more vectors for traveling to the user device 120 (block 416).

The processor 104 next transmits one more instructions or signals 417 causing the wheels to move the robotic system 102 and/or causing the robotic arm 108 to move within reaching distance of the user device 120 (block 418). The example processor 104 then transmits one more instructions or signals 419 causing the end-effector 114 to release the item (block 420). In some embodiments, the processor 104 first receives a command from the user device 120 to release the item. Alternatively, the user may press a button or other control on the end-effector 114 that causes the grip to relax or release, thereby allowing the user to obtain the item. The example procedure 400 then ends.

The processor 104 may also cause the robotic system 102 to move away a certain distance, move an arm-length away, move to rest spot or charging dock, or return to a charging station.

Returning to FIG. 1, the user device 120 and/or the robotic system 102 may be communicatively coupled to a network 130 via a wired or wireless connection. The network may include a cellular network, a local area network, a wide area network, or combinations thereof. A server 140 may also be coupled to the network 130. The server 140 is communicatively coupled to a memory device 142 storing instructions 144, which when executed by the server 140, enable the server 140 to perform the operations described herein.

In some embodiments, commends entered by a user via the mobile application 122 are transmitted to the server 140, which may include a cloud-based service that routes the commands to the robotic system 102. Such a configuration enables a remote user to control the robotic system 102, which may be beneficial for people with extreme mobility challenges. In these instances, the user device 120 is remote from the robotic system 102.

The example server 140 may also provide updates to the instructions 112 at the robotic system 102. The updates may include updates for machine vision, item recognition, robotic arm control, etc. The server 140 may also receive diagnostic and/or fault information from the robotic system 102.

Figure 5:
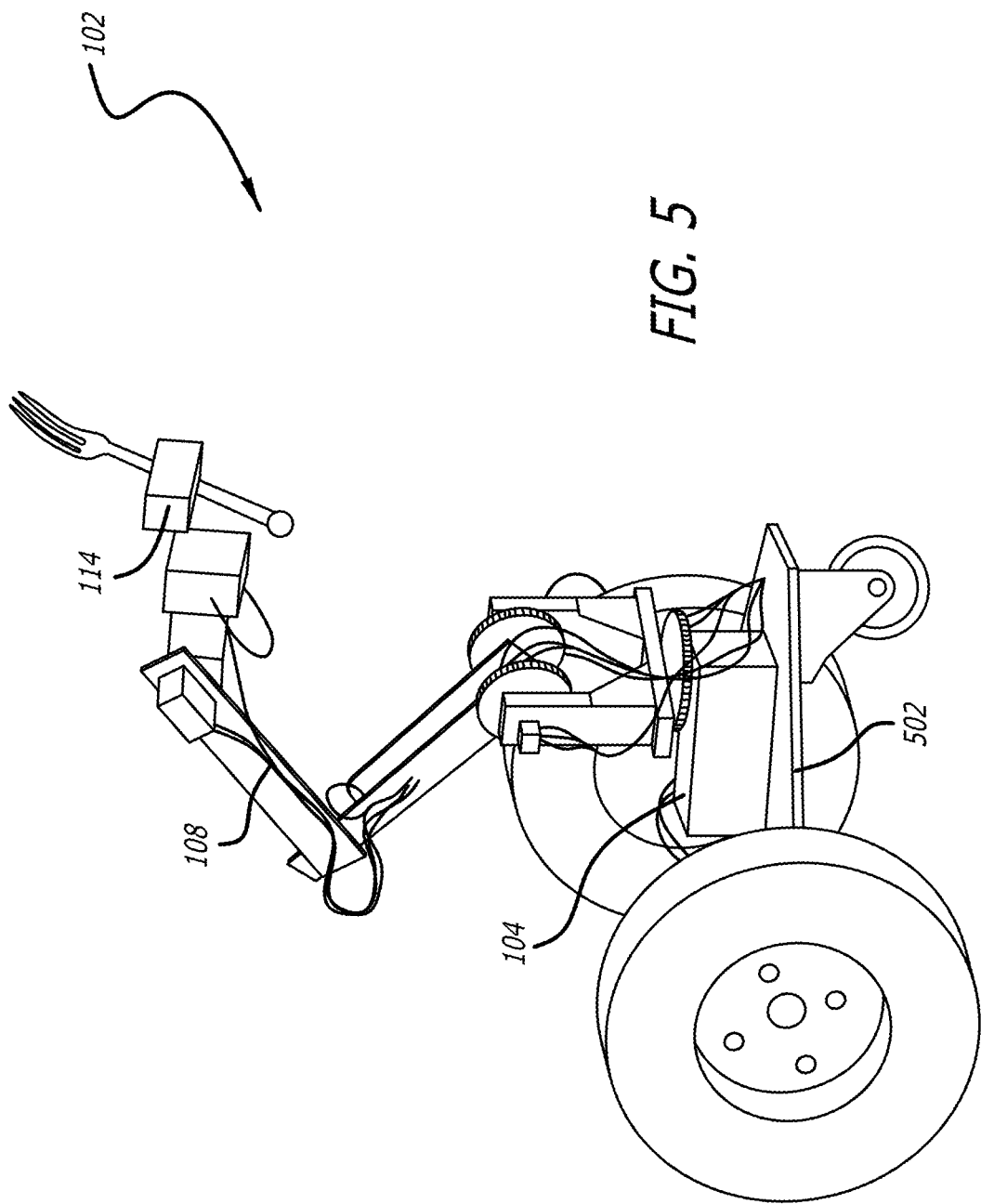
FIG. 5 is a diagram of the robotic system of FIG. 1, according to an example embodiment of the present disclosure.

FIG. 5 is a diagram of the robotic system 102 of FIG. 1, according to an example embodiment of the present disclosure. The robotic arm 108 includes four joints controlled by respective motors. The robotic arm 108 includes three links, with a rotation of the end-effector 114 being controlled by the fourth joint motor. As shown, the robotic system 102 is mobile, enabling use in small or crowded indoor environments.

Figure 6:
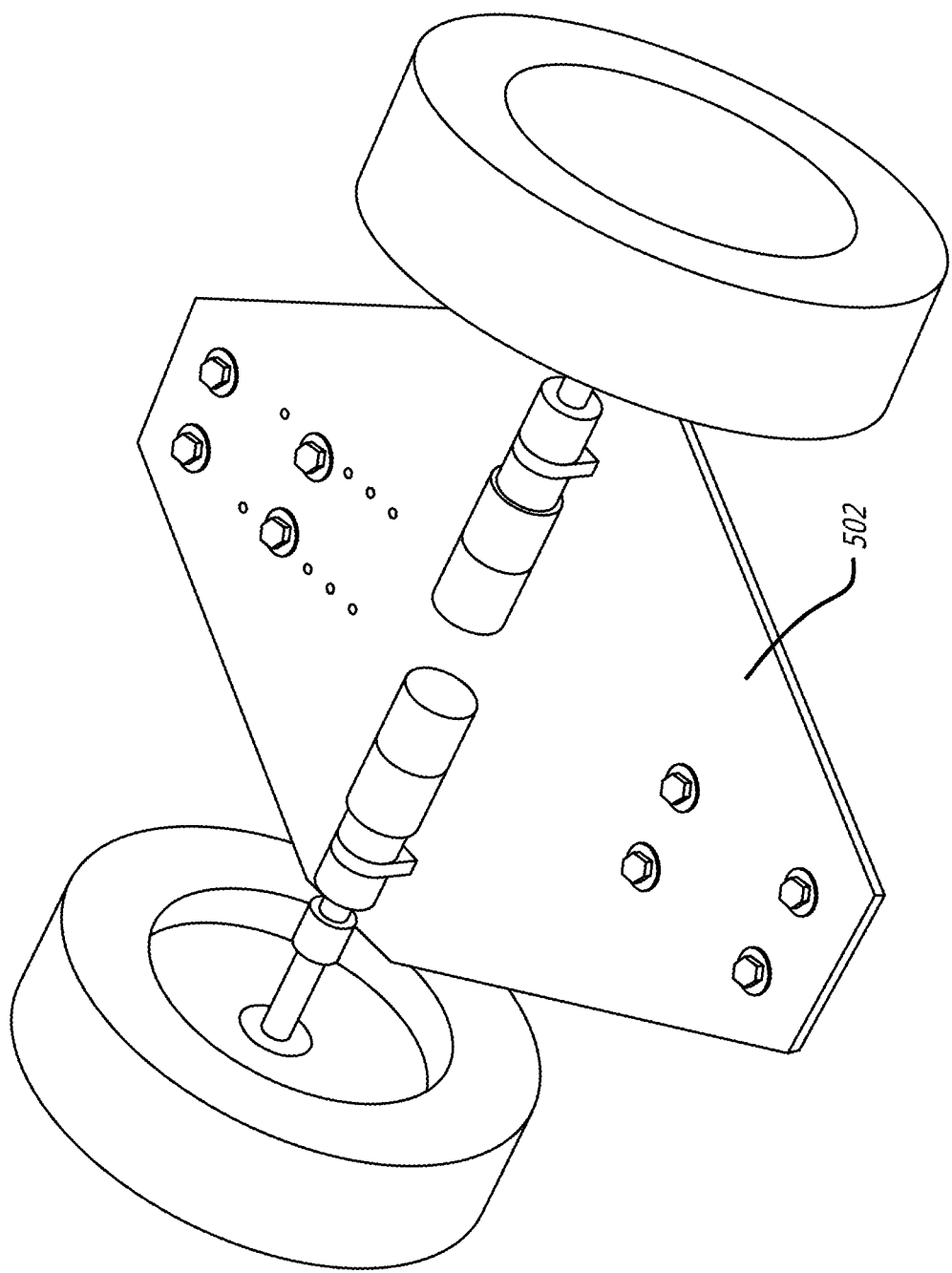
FIG. 6 is a diagram of a platform of the robotic system shown in FIG. 3, according to an example embodiment of the present disclosure.

A platform 502 supports the robotic arm 108 and is connected to front and rear wheels. The rear wheels may be controlled by respective drive DC drive motors 106. The front wheels may include one or two casters for support of the platform 502. FIG. 6 is a diagram of the platform 502 of FIG. 5, according to an example embodiment of the present disclosure. The platform 502 includes a diamond shape chassis, which the rear wheels connected in a center of the diamond shape. The positioning of the rear wheels relative to the platform 502 provides for a zero-radius turning.

The robotic system 102 shown in FIGS. 5 and 6 may have a length between 12 and 18 inches, a width between 6 and 10 inches, and a height of 2 to 3 feet when the robotic arm 108 is fully extended. The robotic system 102 may be configured to lift items between 0 and 5 pounds and weigh less than 20 pounds.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A robotic system comprising:
a platform;
at least two wheels connected to the platform and driven by respective motors;
a robotic arm having a base that is connected to the platform;
an end-effector connected to the robotic arm at an end opposite the base;
a processor communicatively coupled to the respective motors, the robotic arm, and the end-effector; and
a memory device storing instructions, which when executed by the processor, cause the processor to:
  receive a command or determine that an item has fallen on a floor,
  locate the item on the floor,
  determine a distance and a heading to the item,
  cause the respective motors to move the platform to the item within range of the robotic arm,
  cause the robotic arm to grasp the item with the end-effector, and
  cause the robotic arm to provide the item to a user.

2. The robotic system of claim 1, further comprising at least one sensor that is adjacent to the end-effector, the at least one sensor including at least one of a camera, a microphone, a laser range finder, a force sensor, and an inertial sensor.

3. The robotic system of claim 2, wherein the processor receives data from the at least one sensor to at least one of (i) determine the item has fallen on the floor, or (ii) locate the item on the floor.

4. The robotic system of claim 1, wherein the robotic arm includes at least two joints and three links.

5. The robotic system of claim 1, wherein the processor is communicatively coupled to a user device via a wireless connection.

6. The robotic system of claim 5, wherein the processor uses at least the connection with the user device to determine a heading or a distance to the user for providing the item to the user.

7. The robotic system of claim 5, wherein the processor is further configured to:
receive signals from beacons for determining a first position;
receive information indicative of a second position from the user device;
determine a distance vector from the processor to the user device using the first position and the second position; and
cause the respective motors to move the end-effector to the user device based on the distance vector.

8. The robotic system of claim 7, wherein the processor is further configured to:
receive information indicative of a height or an altitude from the user device;
determine a height or an altitude of the end-effector; and
cause the respective motors to move the end-effector to the user device based on the distance vector and the information indicative of the height or the altitude of the user device and the height or the altitude of the end-effector.

9. The robotic system of claim 5, wherein the processor receives the command from the user device.

10. The robotic system of claim 9, wherein the command includes instructions for moving the platform to the item.

11. The robotic system of claim 9, wherein the command includes instructions for moving the robotic arm to grasp the item.

12. The robotic system of claim 1, wherein the platform includes a diamond shape chassis.

13. The robotic system of claim 1, wherein the end-effector is a gripper.

14. The robotic system of claim 1, wherein the platform and the robotic arm are foldable for stowability.

15. A robotic system comprising:
a platform;
at least two wheels connected to the platform and driven by respective motors;
a robotic arm having a base that is connected to the platform, the robotic arm including at least two joints that are rotated by respective joint motors;
an end-effector connected to the robotic arm at an end opposite the base;
a processor communicatively coupled to the respective motors, the robotic arm, and the end-effector; and
a memory device storing instructions, which when executed by the processor, cause the processor to:
determine a current position and an orientation of the robotic arm or the end-effector using feedback from the joint motors,
determine a transformation between the current position and an orientation of the robotic arm or the end-effector and an original, zero-point position and orientation,
receive a movement command from a user device,
determine movement instructions by applying the determined transformation to the movement command, and
transmit the movement instructions to at least one of the motors of the at least two wheels or the joint motors of the robotic arm.

16. The robotic system of claim 15, wherein the original, zero-point position and orientation includes a known distance and orientation between the base of the robotic arm on the platform and the end-effector.

17. The robotic system of claim 15, wherein the movement command is received in conjunction with a command to provide field-of-view movement instead of absolute movement.

18. The robotic system of claim 15, further comprising at least one sensor that is adjacent to the end-effector, the at least one sensor including at least one of a camera or a laser range finder.

19. The robotic system of claim 18, wherein the processor is further configured to transmit data from the at least one sensor to the user device.

20. The robotic system of claim 15, wherein the platform includes a diamond shape chassis where at least two rear wheels are connected to a center of the diamond shape chassis.

* * * * *